United States Patent [19]

Ikeda et al.

[11] 4,257,896
[45] Mar. 24, 1981

[54] COUNTERCURRENT LIQUID-SOLID CONTACTING APPARATUS

[75] Inventors: Yorifumi Ikeda, Osaka; Akira Nakatani, Amagasaki; Yasuhiro Tsujimoto, Osaka, all of Japan

[73] Assignee: Takeda Chemical Industries, Ltd., Osaka, Japan

[21] Appl. No.: 40,083

[22] Filed: May 17, 1979

[30] Foreign Application Priority Data

| May 24, 1978 | [JP] | Japan | 53-62640 |
| May 26, 1978 | [JP] | Japan | 53-63505 |
| Feb. 5, 1979 | [JP] | Japan | 54-12516 |

[51] Int. Cl.$^3$ .............................................. B01D 23/10
[52] U.S. Cl. .................................. 210/268; 210/279; 210/291
[58] Field of Search ............... 210/31 R, 32, 33, 80, 210/81, 83, 189–191, 268, 279, 291, 292, 293

[56] References Cited

U.S. PATENT DOCUMENTS

| 3,512,639 | 5/1970 | Kugelman et al. | 210/80 |
| 3,512,640 | 5/1970 | Hellmann | 210/80 |
| 3,674,685 | 7/1972 | Arden et al. | 210/33 |

Primary Examiner—S. Leon Bashore
Assistant Examiner—Ferris H. Lander
Attorney, Agent, or Firm—Wenderoth, Lind & Ponack

[57] ABSTRACT

A countercurrent liquid-solid contacting apparatus having combined filtering and regenerating columns stacked one above the other. The filtering column has a liquid inlet and outlet, a liquid medium to be filtered being supplied into the filtering column through the liquid inlet and discharged to the outside through the liquid outlet after having passed upwardly through a bed of filtering material within the filtering column. The regenerating column has its bottom end opening into the filtering column and supplies a filtering material in an amount necessary to compensate for a reduction in the amount of the filtering material within the filtering column each time a portion of the filtering material in a lower region of the filtering column is withdrawn and then transported back into the regenerating column. Since the regenerating column is a closed vessel, pipe lines sealed to the atmosphere by liquid medium extending outwardly from the liquid outlet and also from the regenerating column have a predetermined relationship with each other.

13 Claims, 7 Drawing Figures

COUNTERCURRENT LIQUID-SOLID CONTACTING APPARATUS

BACKGROUND OF THE INVENTION

The present invention generally relates to a countercurrent liquid-solid contacting apparatus and, more particularly, to a countercurrent liquid-solid contacting apparatus of a so-called combination type comprised of a purifying column and a regenerating column for regenerating a purifying material used in the purifying column.

The term "combination type" herein used is to be understood as meaning a liquid-solid contacting apparatus wherein the purifying and regenerating columns are combined into a single structure. By "purifying" is meant removing of contaminant materials from the treated liquid by filtration or adsorption.

A combination type liquid-solid contacting apparatus is disclosed in the Japanese Patent Publication No. 48-21551, published for opposition on June 29, 1973. According to this publication, the conventional liquid-solid contacting apparatus comprises a filtering column and a regenerating column mounted on and in communication with the top of the filtering column through a connecting passage which extends between the top of the filtering column and the downwardly tapered bottom of the regenerating column. The filtering column has its downwardly tapered bottom in communication with a source of regenerating fluid medium under pressure, either compressed air or liquid under pressure, and a discharge port defined therein at a portion adjacent the top thereof. The connecting passage between the filtering column and the regenerating column is also in communication with the source of regenerating fluid medium under pressure. First and second switching valves are respectively disposed in a first fluid line between the bottom of the filtering column and the source of the regenerating fluid medium under pressure and in a second fluid line between the discharge port and the source of the regenerating fluid medium under pressure.

The conventional liquid-solid contacting apparatus further comprises a vertically extending guide tube having a lower end positioned inside the filtering column in alignment with and in spaced relation to the opening at the bottom of the filtering column to which the first fluid line is connected, and the other extending coaxially through the connecting passage and terminating inside the regenerating column. The guide tube has a distributor tube of a diameter larger than that of the guide tube, which is rigidly mounted on a portion of the guide tube inside the filtering column and is connected to a source of a contaminated fluid medium to be substantially purified through a supply line.

At the outset, the filtering column is completely filled with a filtering material to provide a bed of filtering material whereas the regenerating column is filled with the same type of filtering material as used in the filtering column in an amount sufficient to cause particles of the filtering material inside the regenerating column to be fluidized when the necessity arises. The filtering material inside the regenerating column fills up not only a portion of the regenerating column, but also completely fills the connecting passage.

In this conventional liquid-solid contacting apparatus of the construction described above, a substantial purification of the contaminated liquid medium is carried out by, while the first and second switching valves are closed, supplying the contaminated liquid medium into the distributor tube and, then, causing the contaminated liquid medium inside the distributor tube to flow in a direction radially outwardly of the distributor tube and diagonally upwardly through the bed of filtering material. When the filtering material inside the filtering column is contaminated and during or subsequent to the process of purification of the contaminated liquid medium taking place in the manner described above, the first valve is opened to effect the supply of the regenerating fluid medium under pressure into the filtering column. The regenerating fluid medium under pressure so supplied flows into the guide tube while entraining particles of the filtering material adjacent the bottom of the filtering column into the stream of the regenerating fluid medium under pressure, whereby the contaminated filtering particles can be transported upwardly through the guide tube into the regenerating column by the stream of the regenerating fluid medium under pressure.

During the continued supply of the regenerating fluid medium under pressure into the guide tube, suspended solids adhering to and, therefore, contaminating the filtering particles are separated from the filtering particles being not only transported through the guide tube, but also fluidized within the regenerating column, the separated suspended solids being thereafter discharged to the outside of the regenerating column together with a liquid component. Forced separation of the suspended solids from the filtering particles transported into the regenerating column can be effected by subsequently supplying the regenerating fluid medium under pressure into the connecting passage through the second fluid line while the supply of the regenerating fluid medium under pressure through the first fluid line is interrupted.

SUMMARY OF THE INVENTION

The present invention has for its essential object to provide an improved countercurrent liquid-solid contacting apparatus of the combination type wherein the contaminated liquid medium to be purified can be supplied upwardly through the bed of filtering or adsorbent material at a relatively high speed without the particles being fluidized undesirably.

Another important object of the present invention is to provide an improved countercurrent liquid-solid contacting apparatus of the type referred to above, which is capable of substantially purifying the contaminated liquid medium in a relatively short period of time.

A further object of the present invention is to provide an improved countercurrent liquid-solid contacting apparatus of the type referred to above, wherein a restraint structure is employed to avoid the possible fluidization and/or expansion of the filtering or adsorbent bed.

A still further object of the present invention is to provide an improved countercurrent liquid-solid contacting apparatus of the type referred to above, which can be manufactured with a minimum number of parts and which does not require a complicated manipulation for effecting the switchover from a purification mode to a regeneration mode, and vice versa.

According to the present invention, there is provided a countercurrent liquid-solid contacting apparatus which comprises a combined unit of a liquid treating and a regenerating column. The liquid treating column has a treatment bed of filtering or adsorbent material therein, material inlet and outlet means at its top and bottom, and liquid inlet and outlet means at respective lower and upper portions thereof adjacent the top and bottom thereof. A liquid medium to be substantially purified is adapted to be introduced into the liquid treating column through the liquid inlet means and, once so introduced, flows upwardly through the treatment bed towards the liquid outlet means. The material outlet means is in communication with a material discharge pipe extending downwardly from the liquid treating column and having a shut-off valve disposed therein for drawing out of the liquid treating column during the opening of said shut-off valve a portion of the material of the bed which is located in a lower region of the liquid treating column and which has been excessively contaminated by suspended solids contained in and subsequently removed from the liquid medium to be purified.

The regenerating column has its top end closed to the atmosphere and is firmly mounted on the liquid treating column with its bottom end protruding into the liquid treating column through the material inlet means. This regenerating column is filled with an extra amount of the same treatment material as the material forming the treatment bed in the liquid treating column, which extra treatment material is contiguous to the treatment material in the liquid treating column so that, when that portion of the treatment material is drawn out of the liquid treating column, the extra treatment material in the regenerating column can flow by gravity into the liquid treating column to compensate for the reduction in the amount of the treatment material in the liquid treating column.

For transferring that portion of the treatment material drawn out of the liquid treating column during the opening of the shut-off valve, a transfer means, which may be either a slurry pump or an ejector to be connected to a pressure liquid source, is installed between the material discharge piping and a transport piping leading into the regenerating column. The suspended solids contained in that portion of the treatment material drawn out of the liquid treating column are separated therefrom during the transport of the contaminated treatment material through the transport piping and/or when the contaminated treatment material thus transferred into the regenerating column is fluidized within the regenerating column.

The suspended solids removed from the treatment material and floating within the regenerating column are discharged to the outside of the regenerating column through an exhaust piping having one end in communication with an exhaust port opening out of the regenerating column at a position spaced a predetermined distance from the closed top end of the regenerating column. This exhaust piping has the opposite end sealed from the atmosphere by a liquid medium at a position spaced a predetermined distance from the level of the opening of the exhaust port within the regenerating column.

In order to allow a portion of the liquid medium being purified within the liquid treating column to flow into the regenerating column to fluidize, should the necessity occur, the extra treatment material in the regenerating column, a liquid discharge piping having one end in communication with the liquid outlet means extends therefrom a predetermined distance to a level above the top level of the exhaust port within the regenerating column.

Preferably, the distance H1 between the level of the opening of the exhaust port in the regenerating column and the siphon-breaking point of the liquid discharge piping and the distance H2 between the level of the opening of the exhaust port in the regenerating column and the level at which the other end of the exhaust piping is liquid-sealed are so selected as to have the following relationship.

$$H1 > \Delta P - H2$$

wherein $\Delta P$ represents the loss of pressure of the filtered liquid medium flowing from the bottom open end of the regenerating column towards the level of the opening of the exhaust port excluding the loss of pressure of the regenerating liquid medium $\Delta Pr$ passing through a flow regulator such as valve or nozzle to be provided within the passage of the liquid medium.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
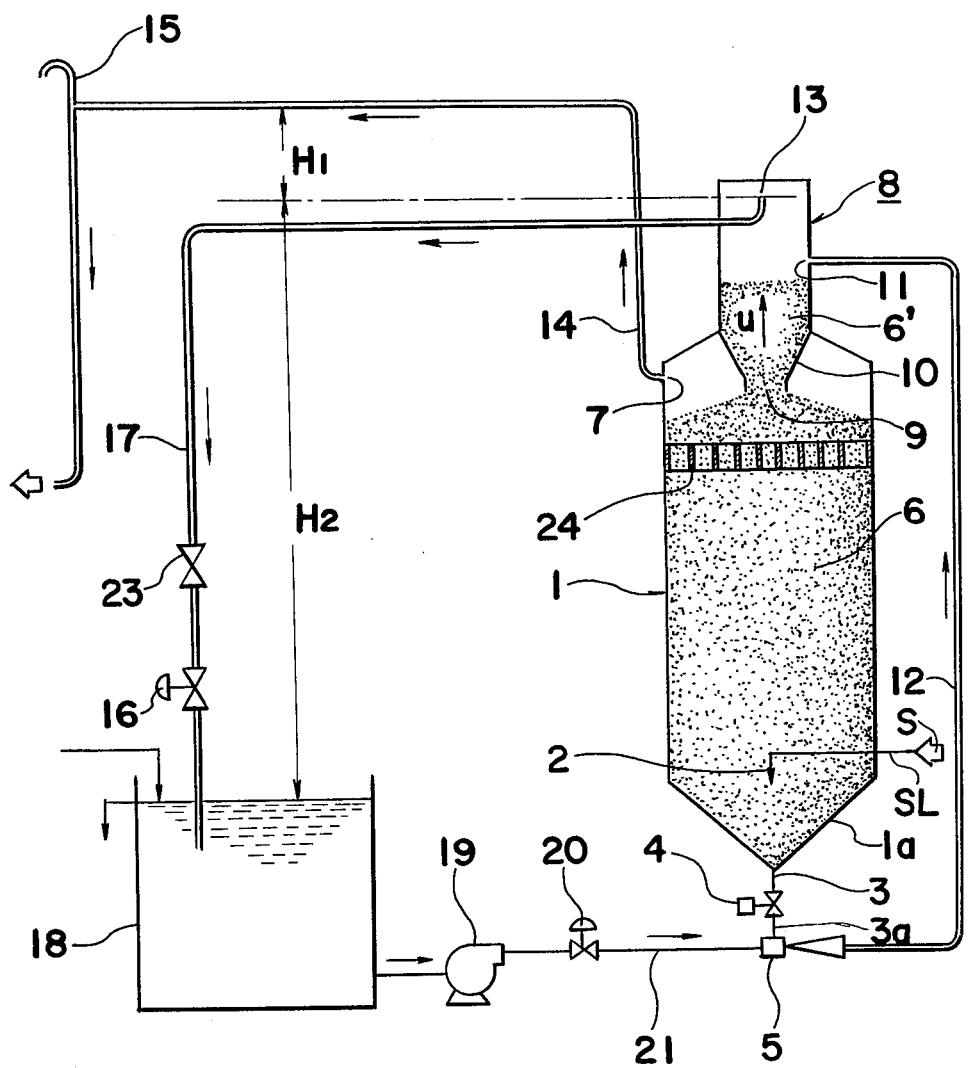
FIG. 1 is a schematic diagram showing a countercurrent liquid-solid contacting system according to the present invention.

Before the description of the present invention proceeds, it is to be noted that like parts are designated by like reference numerals throughout the accompanying drawings for the sake of brevity.

Referring first to FIG. 1, a countercurrent liquid-solid contacting apparatus according to the present invention comprises a combined unit of liquid treating and regenerating columns generally identified by 1 and 8, respectively.

The liquid treating column 1 is in the form of a substantially elongated, cylindrical vessel having its bottom area 1a downwardly tapered, the downwardly tapered bottom having a material outlet 3. Substantially filling liquid treating column 1 is a bed of any known filtering or adsorbent material 6. The remainder of the description will be for a bed of filtering material only, but it will be understood that the description is equally applicable to a bed of adsorbent material. A perforated restraint structure 24 is held in position inside the liquid treating column 1, the details of said restraint structure 24 being described later. The liquid treating column 1 has a liquid inlet 2 therein at a position adjacent the downwardly tapered bottom area 1a and through which a liquid medium to be filtered or purified (which liquid medium is hereinafter referred to as "contaminated liquid" for the sake of avoiding any possible confusion) from a supply source S of conventional type such as a pump or a liquid reservoir each having a liquid head large enough for introducing the contaminated liquid to the height of an exhaust port 13 as described hereinafter is introduced into the liquid treating column 1 by way of a supply line SL. The liquid inlet 2 is preferably designed so that the contaminated liquid emerging from the supply line SL can flow upwards through the filtering bed 6, the filtration being effected during the upward flow of the liquid through the filtering bed 6.

Extending downwardly from the tapered bottom of the liquid treating column 1 is a material discharge pipe 3a having one end in communication with the material outlet 3 and the other end in communication with a suction port of an ejector 5 of any known construction, said material discharge pipe 3a having a shut-off valve 4 installed thereon.

The liquid treating column 1 also has a liquid outlet 7 defined therein at a position adjacent and below the top thereof, the top of said liquid treating column 1 being partially open to accommodate the regenerating column 8. This regenerating column 8 is in the form of an elongated, cylindrical vessel having its bottom area downwardly tapered at 10 and extending into the liquid treating column 1 with the bottom opening 9 of said regenerating column 8 spaced downwardly from the top of the column 1 and upwardly from the perforated restraint structure 24 in the column 1, the end of said regenerating column 8 opposite to the bottom opening 9 being closed. The regenerating column 8 contains therein an extra amount of the same filtering material 6' as the filtering material 6 in the liquid treating column and, in practice, since the filtering material 6' is allowed to flow by gravity into the liquid treating column 1 through the bottom opening 9, there is no interruption between the filtering materials 6' and 6. It is to be noted that, although the bottom area of the regenerating column 8 has been described and shown as downwardly tapered at 10 to obtain a streamline flow of the purified liquid through the filtering bed without generating a turbulent flow of the suspended liquid to be discharged from the liquid outlet 7 of the liquid treating column, it may remain cylindrical depending upon the size and shape of the regenerating column 8.

For supplying a portion of the filtering material 6 drawn into the material discharge pipe 3a during the opening of the shut-off valve 4 under the influence of a gravity force into the regenerating column 8 for regenerating that portion of the filtering material, there is employed a transport pipe 12 having one end connected to a discharge port of the ejector 5 and the other end opening into the regenerating column 8 at a position substantially intermediately of the height of the regenerating column 8. In practice, that portion of the filtering material is transferred to the regenerating column 8 through the transport pipe 12 together with a regenerating liquid medium under pressure flowing at high speed from a supply port towards the discharge port within the ejector 5 as is well known to those skilled in the art. For this purpose, the supply port of the ejector 5 is connected through a supply pipe 21 to a source of the regenerating liquid medium, for example, a reservoir 18, by means of a pump 19 and a shut-off valve 20, both said pump 19 and shut-off valve 20 being disposed in said supply pipe 21.

The regenerating column 8 has an exhaust port 13 defined therein and positioned above the open end 11 of the transport piping 12 opening into the regenerating column 8 and spaced a certain distance from the top of the regenerating column 8. As illustrated in FIG. 1, this exhaust port 13 is connected to the reservoir 18 by means of an exhaust pipe 17 having one end connected to the exhaust port 13 and the other end immersed in the liquid medium in the reservoir 18, the top level of the liquid medium in the reservoir 18 being spaced a predetermined distance H2 from and below the level of the opening of the exhaust port 13 in the regenerating column 8.

The liquid outlet 7 in the liquid treating column 1, through which a purified liquid medium, that is, the contaminated liquid medium from which suspended solids contaminating the liquid medium have been removed during the flow of the contaminated liquid medium upwardly through the filtering bed within the liquid treating column 1, is discharged to the outside of the liquid treating column 1, is connected to a liquid discharge pipe 14. This liquid discharge pipe 14 extends outwardly from the liquid outlet 7 to the highest point spaced a predetermined distance H1 from and above the level of the opening of the exhaust port 13 within the regenerating column 8, and then connected to a siphon breaker pipe 15 having its opposite ends positioned respectively above and below the highest point of the liquid discharge pipe 14.

Figure 7:
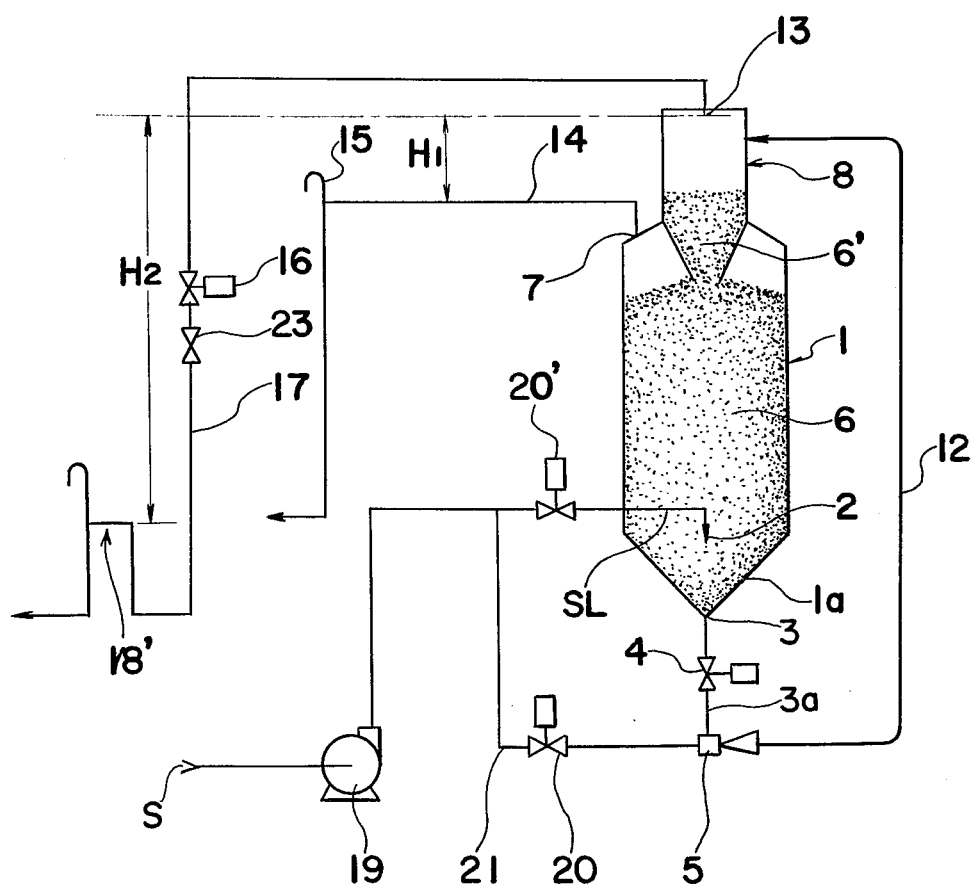
FIG. 7 is a diagram similar to FIG. 1, showing a further preferred embodiment of the present invention.

It is to be noted that, although the highest point, i.e., the siphon-breaking point of the liquid discharge pipe 14 has been described and shown as located at a position spaced the predetermined distance H1 from and above the level of the opening of the exhaust port 13, it may be located on the level of the opening of the exhaust port 13, in which case the predetermined distance H1 has a zero value, or below the level of the opening of the exhaust port 13 such as shown in FIG. 7 in which case the predetermined distance H1 has a negative value.

The details of the perforated restraint structure 24 will now be described with particular reference to FIGS. 4 to 6.

Figure 4:
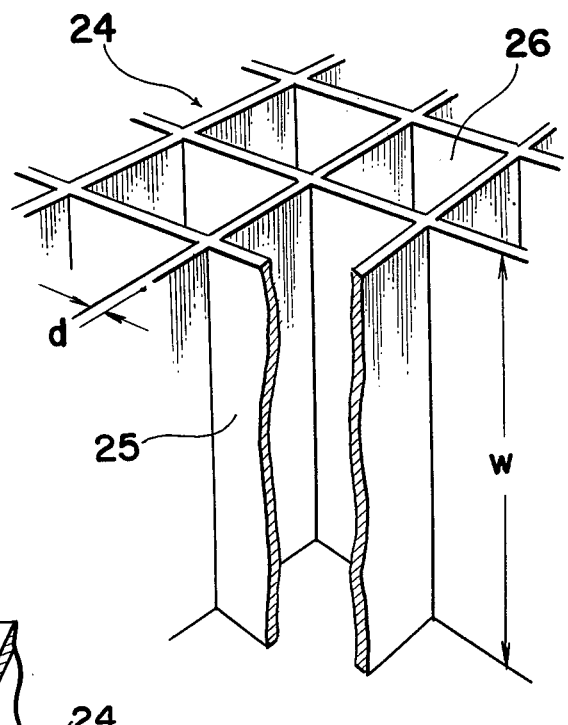
FIG. 4 is a perspective view, on an enlarged scale, of a portion of a restraint structure employed in the apparatus shown in FIG. 1.

Referring first to FIG. 4, the restraint structure 24 shown therein comprises a plurality of elongated wall members 25 each having a predetermined wall thickness d and a predetermined width W, all of said wall members 25 being assembled together to provide a grid structure having a plurality of square-sectioned openings 26 of a depth equal to the width of each wall member. Each of the wall members 25 may be made of any suitable rigid material, for example, a steel material or a synthetic resin such as polyvinyl chloride and must have a width W greater than the wall thickness d. Preferably, the thickness d is within the range of 1 to 10 mm.

The restraint structure 24 must have a predetermined ratio of the total cross sectional surface area of the openings 26 relative to the sum of the total cross sectional surface area of the openings 26 and the total cross sectional surface area of the wall members 25, which ratio is hereinafter referred to as the "opening ratio". The larger the opening ratio and/or the height of the restraint structure 24, the larger the surface area of contact of the filtering material 6 with the restraint structure, and therefore the restraint structure 24 can impart a resistance to any possible fluidization of the filtering material within the liquid treating column 1.

However, the restraint structure 24 should not have a construction which may disturb a smooth gravitational movement of the filtering material 6 within the liquid treating column which will take place at a speed of 1 to 10 cm/min. when that portion of the filtering material 6 at the lower region of the liquid treating column 1 is withdrawn. In addition, the restraint structure 24 should not have a construction which may otherwise cause particles of the filtering material to clog in some or all of the openings 26. In view of this, the opening ratio and the height of the restraint structure 24 should be carefully selected in a manner which will now be described.

The opening ratio of the restraint structure 24 as hereinbefore defined is determined by the wall thickness d of each of the wall members 25 and the shape of each of the openings 26 defined by such wall members 25. According to an experiment conducted by the inventors wherein a restraint structure 24, 10 cm. in height, having a construction comprising a plurality of elongated wall members arranged in parallel relation to each other and with adjacent wall members spaced a distance of 5 mm., was used in an experimental apparatus with sand having an average particle size of 1.08 mm. filling the column 1 as the filtering material and water was pumped into the material up to the level of the top surface of the sand and wherein the filtering material was caused to flow by gravity at a speed of 10 cm/min. during the opening of the shut-off valve 4, a smooth downward movement of the filtering material within the liquid treating column 1 was observed, the flow not being by the restraint structure.

As can be readily understood from the result of the experiment, the size of each of the openings 26 in the restraint structure 24 is to be so selected so that the minimum space between adjacent wall members 25 is larger than a few times the average particle size of the filtering material used and, simultaneously therewith, the height of the restraint structure 24, represented by the width W of each of the wall members 25, is selected to be larger than 5% of the height of the filtering bed. By so constructing the restraint structure, it will be appreciated that the filtering material within the liquid treating column 1 can flow smoothly downwards by gravity past the restraint structure 24 during the opening of the shut-off valve 4. It is to be noted that the maximum height of the restraint structure is preferably not larger than 50% of the height of the filtering bed. If the height of the restraint structure is larger than 50% of the height of the filtering bed, not only is a uniform distribution of the contaminated liquid through the filtering bed in the liquid treating column difficult, but also the apparatus will require an increased manufacturing cost.

The opening ratio of the restraint structure is preferably sufficiently large so that the linear velocity of flow of the contaminated liquid upwardly through the filtering bed within the liquid treating column 1 will not increase as the contaminated liquid passes through the openings in the restraint structure. However, depending on the linear velocity of flow of the contaminated liquid, the opening ratio of the restraint structure may have a small value provided that the increased linear velocity of flow of the contaminated liquid upwardly through the openings in the restraint structure will not cause the filtering particles to fluidize and/or expand at a region adjacent the restraint structure. In view of this, the opening ratio of the restraint structure has a minimum value determined in relation to the linear velocity of flow of the contaminated liquid within the liquid treating column 1.

More specifically, in the countercurrent liquid-solid contacting apparatus having the specific construction used in the subsequently described Example of the present invention, since it has been found that the filtering particles tend to fluidize or expand at a region adjacent the restraint structure when the linear velocity of flow of the contaminated liquid is equal to or higher than 40 m/hr, it is sufficient that the opening ratio of the restraint structure be larger than 75% where the contaminated liquid is allowed to flow upwardly through the filtering bed at a linear velocity of 30 m/hr. On the other hand, where the contaminated liquid is allowed to flow upwardly through the filtering bed at a linear velocity of 20 m/hr, an opening ratio larger than 50% is sufficient.

It is to be noted that the restraint structure 24 need not be limited to the grid structure such as shown in FIG. 4, or the parallel arrangement of the wall members, but it may be comprised of a plurality of tubes bundled together. Moreover, the openings in the restraint structure need not be limited to a square cross section such as shown in FIG. 4, but they may have any suitable cross sectional shape, for example, triangular or hexagonal.

Figure 5:
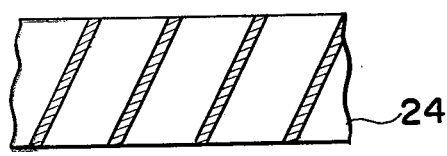
FIG. 5 is a side sectional view, showing a modified form of the restraint structure.
Figure 6:
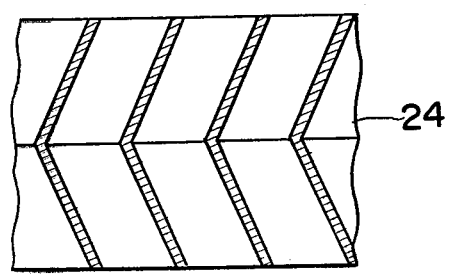
FIG. 6 is a side sectional view, showing a further modified form of the restraint structure.

Furthermore, each of the openings in the restraint structure 24, which is shown in FIGS. 1 and 4 as extending in parallel relation to the longitudinal axis of the liquid treating column 1, may have the longitudinal axis inclined relative to the longitudinal axis of the liquid treating column 1 such as shown in FIG. 5. In the arrangement shown in FIG. 5, the restraint structure 24 is comprised of a plurality of wall members arranged in parallel and spaced relation to each other and inclined in the same direction relative to the longitudinal axis of the liquid treating column. The restraint structure 24 having the construction shown in FIG. 5 may be utilized singly or in combination with a similar restraint structure stacked thereon to provide a restraint structure as shown in FIG. 6. In the restraint structure shown in FIG. 6, each of the openings is bent.

The filtering material which may be employed in the present invention includes, in addition to the sand referred to above, anthracite, glass or porcelain and adsorbent material such as activated carbon, activated alumina, silica gel, synthetic zeolite or synthetic resin.

Hereinafter, the operation of the countercurrent liquid-solid contacting apparatus of the construction as hereinbefore described will be described.

Assuming that the contaminated liquid is supplied under pressure to the liquid inlet 2 through the supply line SL while the shut-off valves 4, 16 and 20 are all closed, the contaminated liquid emerging from the liquid inlet 2 is forced to flow upwardly through the filtering bed within the liquid treating column 1. During the passage of the contaminated liquid through the filtering bed, the suspended solids contained therein are removed and a substantially purified liquid is discharged through the liquid outlet 7.

At predetermined time intervals which may be determined in consideration of the extent to which the filtering material forming the filtering bed in the liquid treating column 1 are contaminated by the suspended solids removed from the contaminated liquid, a portion of the filtering material at a lower region of the liquid treating column 1 is withdrawn. This is readily accomplished by opening the shut-off valves 4, 16 and 20 and, at the same time, operating the pump 19. As hereinbefore described, that portion of the filtering material so withdrawn is transported to the regenerating column through the transport pipe 12 together with the regenerating liquid medium pumped by the pump 19 from the reservoir 18 and passing through the ejector 5. Thereafter, the shut-off valve 4 and, subsequently, the shut-off valve 20 are closed and the pump 19 is deactivated, and the shut-off valve 16 remains opened. The time at which the shut-off valves 4 and 20 are closed may be determined in consideration of the amount of that portion of the filtering material required to be withdrawn from the lower region of the liquid treating column 1 and the volume of the regenerating column 8. It is to be noted that the flow regulator 23 is opened at this time, the amount of opening of said flow regulator 23 being such as to impart a predetermined resistance to the flow of liquid through the exhaust pipe 17 so that a portion of the purified liquid will flow at a controlled velocity into the regenerating column through the bottom opening 9 of the regenerating column 8 to stably fluidize the filtering material 6' within the regenerating column 8. However, the flow regulator 23 need not always be necessary since the shut-off valve 16 can serve the same purpose.

In order for the purified liquid, which has passed through the filtering bed in the liquid treating column 1, to be introduced into the regenerating column 8 through the bottom opening 9, the distance H1 between the level of the opening of the exhaust port 13 and the siphon-breaking point of the liquid discharge pipe 14 and the distance H2 between the level of the opening of the exhaust port 13 and the top level of the liquid within the reservoir 18 should have the following relationship.

$$H1 > \Delta P - H2$$

wherein $\Delta P$ represents the loss of pressure of the purified liquid flowing upwardly from the bottom opening 9 to the exhaust port 13 within the representing column 8.

Since the pressure loss $\Delta P$ varies depending upon not only the physical properties and amount of the filtering material and the velocity of flow of the contaminated and the purified liquid, but also the shape of the regenerating column 8, all of the distances H1 and H2 and the pressure loss $\Delta P$ are considered as variables and the foregoing relationship can be attained by suitably selecting, for example, the height of the downwardly tapered bottom area 10 and the size of the bottom opening 9 of the regenerating column 8.

The purified liquid introduced into the regeneration column 8 through the bottom opening 9 is used to fluidize the filtering material within the regenerating column 8 so that the suspended solids adhering to the filtering particles transported into the regenerating column 8 through the transport pipe 12 can be separated from the filtering particles while the latter are washed by fluidization. The suspended solids so separated are carried by the now contaminated liquid into the exhaust port 13 along with the regenerating liquid from the pipe 12 and then discharged to the reservoir 18 by way of the exhaust pipe 17. It is to be noted that the amount of the filtering material 6' within the regenerating column 8 corresponds to the amount of the contaminated filtering material to be withdrawn from the liquid treating column 1 through the material discharge port 3 during each opening of the shut-off valve 4.

Simultaneously with the withdrawal of the contaminated filtering material from the liquid treating column 1 through the material discharge port 3 for transportation to the regenerating column 8 during the opening of the shut-off valve 4, the filtering bed within the liquid treating column 1 descends and, the resultant reduction in the amount of the filtering material remaining within the liquid treating column 1 is readily compensated for by the filtering material within the regenerating column 8 which flows by gravity into the liquid treating column 1 through the bottom opening 9. Therefore, there is no possibility that the filtering material transported into the regenerating column 8 will readily enter the liquid treating column 1 immediately after the entry thereof into the regenerating column 8. In addition, since the filtering material within the regenerating column 8 and the wall defining the downwardly tapered bottom area 10 of the regenerating column 8 provide a resistance to the flow of liquid medium during not only the filtering operation, but also the regenerating operation, there is no possibility that the purified liquid medium which becomes contaminated within the regenerating column 8 will flow into the liquid treating column 1 and then admix with the purified liquid medium.

Subsequent to the completion of the regenerating operation wherein the filtering material transported into the regenerating column 8 is regenerated by washing, the shut-off valve 16 is closed on one hand and the contaminated liquid is again supplied into the liquid treating column through the supply line SL to initiate the filtering operation again.

Figure 3:
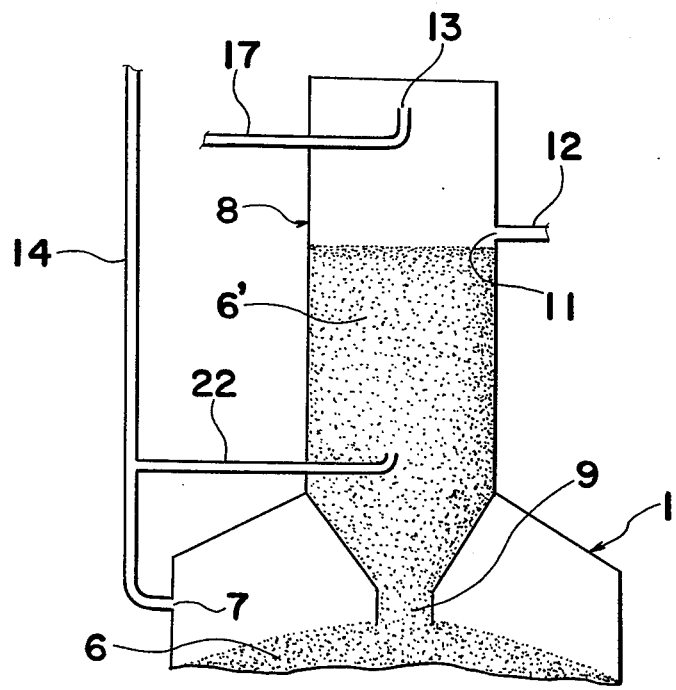
FIG. 3 is a longitudinal sectional view, on an enlarged scale, of a portion of the apparatus, showing another preferred embodiment of the present invention.

It is to be noted that, as shown in FIG. 3, a branch pipe 22 having one end connected to the liquid discharge pipe 14 and the other end extending into the lower region of the regenerating column 8 may be employed to enhance the fluidization of the filtering material 6' within the regenerating column during the regenerating operation.

Furthermore, although the source of the regenerating liquid medium necessary to transport the contaminated filtering material to the regenerating column 8 has been described and shown as constituted by the reservoir 18 to which the contaminated liquid from the regenerating column 8 is discharged by way of the exhaust piping 17, it may be constituted by any suitable liquid source separate from the reservoir 18 or the source of the contaminated liquid as shown in FIG. 7.

Where the source of the contaminated liquid is used as the source of the liquid necessary to transport the contaminated filtering material to the regenerating column 8 by way of the transport pipe 12, the supply line SL should be branched from a portion of the supply pipe 21 between the pump 19 and the shut-off valve 20 on one hand and a shut-off valve 20' similar to, but operable in the opposite sense to, the shut-off valve 20 should be installed in the supply line SL as shown in FIG. 7.

In either of the embodiments shown in FIG. 1 and FIG. 7, the shut-off valve 20 may be installed in the transport pipe 12.

Figure 2:
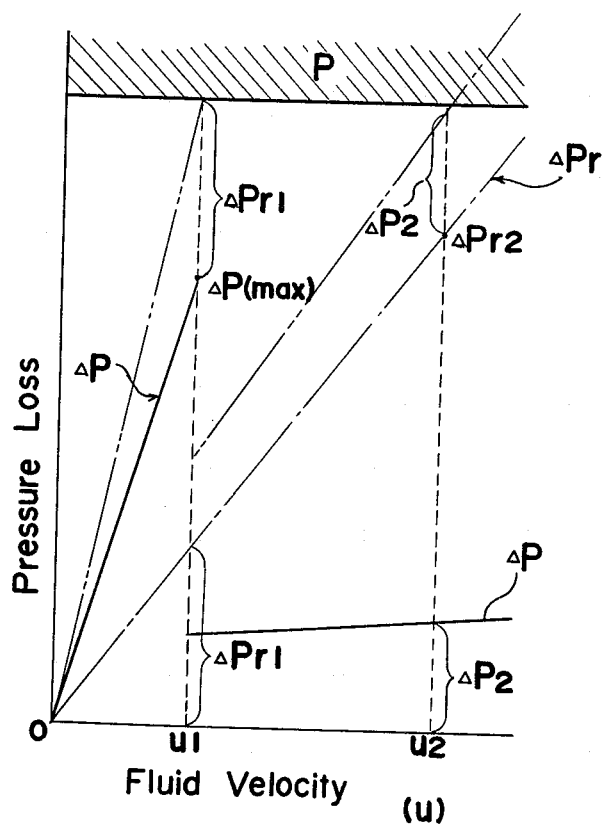
FIG. 2 is a graph showing the relationship between the loss of pressure and the velocity of flow of liquid in the countercurrent liquid-solid contacting system according to the present invention.

Referring now to FIG. 2, the graph shows the relationship between the velocity U of flow of the purified liquid within the regenerating column 8 from the bottom opening 9 towards the level of the opening of the exhaust port 13 and the pressure loss. In this graph, the solid lines represent the pressure loss $\Delta P$ of the purified liquid flowing from the bottom opening 9 towards the exhaust port 13, the single chain line represents the pressure loss $\Delta Pr$ of the contaminated liquid flowing through the flow regulator 23 which may be an orifice and which is disposed in the exhaust pipe 17, and the double chain lines represent the sum of the pressure losses ΔP and ΔPr. From the graph, it will readily be seen that the pressure loss ΔP occurring within the regenerating column 8 attains a maximum value ΔP(max) when the velocity U has a value $U_1$, at which fluidization of the filtering material 6' within the regenerating column 8 is initiated. However, as the fluidization of the filtering material 6' within the regenerating column 8 progresses, the pressure loss occurring within the regenerating column 8 decreases considerably.

On the other hand, since the velocity of flow of the contaminated liquid flowing through the exhaust pipe 17 is in proportion to the velocity U, the pressure loss ΔPr occurring during the passage of this liquid through the flow regulator 23 is in proportion to the fluid velocity U.

In view of the above, if the head (H1+H2) is selected so as to satisfy the following relation (1), the filtering material 6' can be fluidized within the regenerating column.

$$H1+H2 \geqq \Delta P(max) + \Delta Pr_1 \quad (1)$$

wherein $\Delta Pr_1$ represents the pressure loss occurring during the passage of the contaminated liquid through the flow regulator 23 when the fluid velocity U has a value $U_1$. Accordingly, the hatched area as shown by P in the graph of FIG. 2 represents the region where the foregoing relationship (1) is satisfied.

On the other hand, if the sum of the distances H1 and H2 are selected so as to satisfy the relationship (1) above, the fluid velocity $U_2$ which satisfies the following relationship (2) can be determined and, as a result thereof, the filtering material 6' within the regenerating column 8 can be fluidized by the purified liquid flowing at the velocity $U_2$ from the bottom opening 8 towards the exhaust port 13.

$$H1+H2 = \Delta P_2 + \Delta Pr_2 \quad (2)$$

The fluid velocity $U_2$ shown in the graph of FIG. 2 is so selected that the head (H1+H2) attains the lowermost limit sufficient to satisfy the relationship (1) above. Accordingly, the fluid velocity U within the regenerating column 8 during the regenerating operation may be arbitrarily chosen to have a value equal to or higher than the fluid velocity $U_2$.

The present invention will now be described by way of example for the purpose of illustration thereof.

EXAMPLE

The apparatus used has the construction shown in FIG. 1 and is dimensioned as follows.

Liquid treating column 1: 500 mm. in inner diameter
Restraint Structure 24: Parallel arrangement composed of a plurality of elongated wall members each having a 3 mm. wall thickness and being 200 mm. in width and spaced 27 mm. from each other. This restraint structure was embedded in the bed of filtering material with the top spaced 100 mm. downwardly from the top level of the filtering bed. The material for each of the wall members forming the restraint structure was polyvinyl chloride. The opening ratio was 89% and the surface area of contact of the restraint structure to the filtering material was 1.4 m²/m².

Filtering Material: Sand having an in average particle size of 1.08 mm., an effective size of 0.83 and a uniformity coefficient of 1.47. (The effective size is the mesh size of a sieve sufficient to allow 10 wt% of the total amount of the filtering material used to pass through the sieve. The uniformity coefficient is the quotient of the mesh size of a sieve sufficient to allow 60 wt% of the total amount of the filtering material used to pass through the sieve, divided by the mesh size of a sieve sufficient to allow 10 wt% of the total amount of the filtering material used to pass through the sieve.) The amount of the filtering material used was such a value as refiltering material used was sufficient to form a filtering bed 1,000 mm. in.

Regenerating Column 8: Cylindrical vessel having an inner diameter of 150 mm. and a bottom area downwardly tapered as shown in FIG. 1.

By the use of the apparatus described above, the contaminated liquid containing suspended solids in an amount of 100 ppm was filtered at a velocity of 30 m/hr during the filtering operation and the filtering material used was withdrawn from the liquid treating column 1 through the material discharge port 3 at intervals of 1 hour. The velocity of movement of the filtering material during the withdrawal thereof from the liquid treating column was about 6 cm/min.

The apparatus functioned satisfactorily and effectively for 10 hours without the filtering material within the liquid treating column 1 being fluidized nor expanded.

When the apparatus with the restraint structure 24 removed was operated, it was found that, one hour after the initiation of the filtering operation, the filtering material was contaminated to a certain extent by the suspended solids removed from the contaminated liquid and not only did the filtering bed expand, but also the filtering material was fluidized.

Where the restraint structure 24 was employed, it was found that neither expansion nor fluidization of the filtering material took place when the filtering velocity was no higher than 40 m/hr.

The used filtering material which had been withdrawn from the liquid treating column through the material discharge port 3, the amount of which was 8.0 lits. at the individual times of discharge thereof, was transported by the ejector to the regenerating column through the transport pipe. The liquid medium used to transport the used filtering material to the regenerating column 8 was fed back to the reservoir 18 through the exhaust port 13 in the regenerating column 8. During this procedure, the shut-off valves 4, 16 and 20 were opened and the pump 19 was operated.

After the 8 lits. of used filtering material had been transported into the regenerating column in the manner described above, the shut-off valves 4 and 20 were closed and the pump 19 was operated. Shortly thereafter, when the contaminated liquid was supplied into the liquid treating column 1, the purified liquid was in part discharged out of the liquid treating column through the liquid outlet 7 and was in part allowed to flow into the regenerating column 8 through the bottom opening 9 and then discharged out of the regenerating column 8 through the exhaust port 13. The amount of the purified liquid passing through the regenerating column 8 was selected to be 2 m³/hr. That is to say, the velocity of flow of the purified liquid upwardly through the regenerating column 8 was 113 m/hr which was sufficient to cause the filtering material within the regenerating column 8 to fluidize. The fluidization of the filtering material within the regenerating column 8 and the discharge of the purified liquid through the liquid outlet 7 were continued for 30 seconds and, thereafter, the shut-off valve 16 was closed.

During the operation of the apparatus that continued for 10 hours, the content of the suspended solids contained in the purified liquid discharged from the liquid treating column 1 through the liquid outlet 7 was kept at an amount of no more than 1 ppm.

During the regenerating operation, the purified liquid entering the bottom opening 9 of the regenerating column 8 flowed at a linear velocity of 35 to 37 m/hr, which was sufficient to cause the filtering material within the regenerating column 8 to fluidize for the purpose of washing thereof. At this time the maximum pressure loss $\Delta P(max)$ was 0.85 kg/cm$^2$ when the height of the filtering bed in the regenerating column 8 was 1,000 mm. and 0.78 kg/cm$^2$ when the height of the filtering bed was 500 mm. Accordingly, where the pressure loss $\Delta P + \Delta Pr$ was chosen to be 0.86 Kg/cm$^2$, and the distance H2 was 5 m., the distance H1 was selected to be 3.6 m so that the relationship, $H1 > \Delta P - H2 = 0.36 - \Delta Pr$ (kg/cm$^2$) could be satisfied.

Although the present invention has fully been described in connection with the preferred embodiments thereof, it is to be noted that various changes and modifications will be apparent to those skilled in the art. By way of example, the employment of the restraint structure 24 is not always necessary. However, since the restraint structure 24 provides a larger surface area of contact to the filtering material and, hence, a larger resistance to any possible upward movement of the filtering material within the liquid treating column 1 without adversely affecting the fluid velocity of flow of the contaminated liquid and also without providing any obstruction to the downward movement of the filtering material, an increased filtering speed can advantageously be achieved when the restraint structure 24 is employed.

In addition, instead of the employment of the reservoir 18, a substantially inverted U-shaped bent tube such as shown at 18' in FIG. 7 may be employed for liquid-sealing the end of the exhaust pipe 17 remote from the exhaust port 13.

Such changes and modifications are to be understood as being included within the true scope of the present invention unless they depart therefrom.

What is claimed is:

1. An apparatus for purifying a liquid by the countercurrent liquid-solid contact and for regenerating a treatment material used to purify the liquid, which comprises, in combination:
   a liquid treating column having a bed of particles of treatment material therein, said liquid treating column also having treatment material inlet and outlet means at its top and bottom, respectively, and liquid inlet and outlet means at respective lower and upper portions thereof, said liquid inlet means being positioned above the material outlet means and adapted to be connected to a source of the liquid to be purified;
   a regenerating column having its top end closed to the atmosphere and its bottom end extending into the liquid treating column through the material inlet means and having an unvalved lower opening into said liquid treating column, said regenerating column having therein a mass of particles of the same treatment material as that in the liquid treating column, the treatment material in the regenerating column being contiguous to the treatment material in the liquid treating column through said lower opening, said regenerating column further having an exhaust port opening out of the regenerating column;
   a material discharge pipe having one end connected to the material outlet means and having a shut-off valve therein, said shut-off valve being adapted to be opened to allow successive portions of the treatment material adjacent the bottom of the liquid treating column to flow by gravity into the material discharge pipe while the treatment material bed consequently descends in the liquid treating column and the treatment material in the regenerating column flows by gravity into the liquid treating column to compensate for the reduction in the amount of the treatment material in the liquid treating column;
   a transport pipe having one end connected to the interior of the regenerating column;
   transfer means connected between the respective other ends of the material discharge pipe and the transport pipe for moving the particles of treatment material discharged into the material discharge pipe during the time the shut-off valve is open back to the regenerating column through the transport pipe;
   a liquid discharge pipe having one end connected to the liquid outlet means for discharging the purified liquid to the outside of the liquid treating column;
   an exhaust pipe having one end connected to the exhaust port in the regenerating column; and
   liquid seal means at the other end of said exhaust pipe for sealing the exhaust pipe from the atmosphere, said liquid seal means being at a position spaced vertically a predetermined distance from and below the level of the opening of the exhaust port, whereby suspended solids which have been separated from the particles of the treatment material fed back into the regenerating column and which are contained within liquid in the regenerating column are discharged from the regenerating column.

2. An apparatus as claimed in claim 1, further comprising a perforated restraint structure having a plurality of openings of predetermined depth defined therein, said restraint structure being positioned within the liquid treating column and embedded in the upper portion of the treatment material bed.

3. An apparatus as claimed in claim 1, wherein said liquid seal means at said other end of the exhaust pipe is a reservoir.

4. An apparatus as claimed in claim 3, further comprising a perforated restraint structure having a plurality of openings of predetermined depth defined therein, said restraint structure being positioned within the liquid treating column and embedded in the upper portion of the treatment material bed.

5. An apparatus as claimed in claim 3, wherein said transfer means is constituted by an ejector having a supply port connected to said reservoir, a suction port connected to the material discharge pipe and a discharge port connected to the transport pipe, whereby when the liquid is supplied therethrough from the supply port towards the discharge port, the treatment material which has flowed into the material discharge pipe is drawn through the suction port into the stream of the liquid flowing through the ejector and then caused to flow into the transport pipe, said transfer means further comprising valve means for interrupting the flow of the stream of liquid from the reservoir to the regenerating column by the ejector and the transport pipe during the time the shut-off valve in the material discharge pipe is closed.

6. An apparatus as claimed in claim 5, further comprising a perforated restraint structure having a plurality of openings of predetermined depth defined therein, said restraint structure being positioned with the liquid treating column and embedded in the upper portion of the treatment material bed.

7. An apparatus as claimed in claim 1, wherein said transfer means is constituted by an ejector having a supply port adapted to be connected to the source of the liquid to be purified, a suction port connected to the material discharge pipe and a discharge port connected to the transport pipe, and further comprising first and second valve means operable in the opposite sense to each other, said first valve means being between the source of the liquid to be purified and the suction port of the ejector and said second valve means being between the source of the liquid to be purified and the liquid inlet means in the liquid treating column.

8. An apparatus as claimed in claim 7, further comprising a perforated restraint structure having a plurality of openings of predetermined depth defined therein, said restraint structure being positioned within the liquid treating column and embedded in the upper portion of the treatment material bed.

9. An apparatus as claimed in claim 1, wherein the liquid discharge pipe extends upwardly from the liquid outlet means in the liquid treating column to a highest point spaced a predetermined distance H1 from the level of the opening of the exhaust port in the regenerating column, and further comprising a siphon breaker pipe having an opening communicating with the atmosphere, the distance H2 the opening of the exhaust port in the regenerating column is positioned above the level of the liquid seal means being in a relationship with distance H1 of:

$$H1 > \Delta P - H2$$

wherein $\Delta P$ represents the loss of pressure of the liquid flowing upwardly through the treatment material in the regenerating column.

10. An apparatus as claimed in claim 9, further comprising a perforated restraint structure having a plurality of openings of predetermined depth defined therein, said restraint structure being positioned within the liquid treating column and embedded in the upper portion of the treatment material bed.

11. An apparatus as claimed in claim 1, wherein the bottom end of the regenerating column extending into the liquid treating column is downwardly tapered and has said lower opening at the lower end of said tapered bottom end.

12. An apparatus as claimed in claim 1 wherein the liquid discharge pipe has a branch pipe having one end extending into and opening into the lower portion of the regenerating column and having the other end connected to an upwardly extending portion of the liquid discharge pipe for introducing a portion of the purified liquid into the regenerating column to fluidize the treatment material in the regenerating column.

13. An apparatus as claimed in claim 12 further comprising a perforated restraint structure having a plurality of openings of predetermined depth defined therein, said restraint structure being positioned within the liquid treating column and embedded in the upper portion of the treatment material bed.

* * * * *